United States Patent
Lindsay

Patent Number: 5,150,627
Date of Patent: Sep. 29, 1992

[54] CONTROL DEVICE FOR A TILTABLE MOUNTING HEAD

[75] Inventor: Richard A. Lindsay, Suffolk, United Kingdom

[73] Assignee: Vinten Group PLC, United Kingdom

[21] Appl. No.: 730,801

[22] PCT Filed: Feb. 2, 1990

[86] PCT No.: PCT/GB90/00158
§ 371 Date: Jul. 26, 1991
§ 102(e) Date: Jul. 26, 1991

[87] PCT Pub. No.: WO90/09543
PCT Pub. Date: Aug. 23, 1990

[30] Foreign Application Priority Data

Feb. 10, 1989 [GB] United Kingdom ............... 8902976

[51] Int. Cl.$^5$ ............... F16H 37/12; A47G 29/00
[52] U.S. Cl. ............... 74/98; 74/99 R; 74/103; 74/384; 248/185; 248/371; 354/293; 414/917
[58] Field of Search ............... 74/98, 103, 384, 99 R; 248/184, 185, 371, 281.1; 354/293; 414/917

[56] References Cited

U.S. PATENT DOCUMENTS

| | | | |
|---|---|---|---|
| 2,070,941 | 2/1937 | Dust | 74/103 X |
| 2,326,657 | 8/1943 | Johnston | 248/184 X |
| 3,598,264 | 8/1971 | Massie | 414/917 X |
| 4,234,150 | 11/1980 | Mee et al. | 248/281.1 |
| 4,435,120 | 3/1984 | Ikeda et al. | 74/98 X |
| 4,744,460 | 5/1988 | Pazzaglia | 414/917 X |

FOREIGN PATENT DOCUMENTS 1274919 12/1986 U.S.S.R. ............... 414/917

*Primary Examiner*—Allan D. Herrmann
*Attorney, Agent, or Firm*—Lee, Mann, Smith, McWilliams, Sweeney & Ohlson

[57] ABSTRACT

A control device for a tiltable mounting head, such as the mounting head for a camera, includes a pantographic-type linkage. The angular position of an arm (24) supporting the mounting head (26) is controlled relative to a locating arm (12), whose remote end is pivoted to fixed structure (16) by three meshing gears, of which one (10) is connected to the locating arm (12) and another gear (20) is connected to the arm (24). The gears are rotatably mounted on a rigid arm (22) of the linkage of which an intermediate point (28) is constrained to move along a horizontal path.

6 Claims, 2 Drawing Sheets

CONTROL DEVICE FOR A TILTABLE MOUNTING HEAD

BACKGROUND OF THE INVENTION

1. Field of the Invention

This invention relates to a control device for a tiltable mounting head.

2. Description of the Related Art

A pantographic control device for a tiltable mounting head, for example a mounting head for a camera or antenna, is known from U.K. Specification No. 1451088. The pantographic tilt control mechanism described in this specification provides the substantial advantage that, during tilting, the centre of gravity of an item of equipment mounted on the mounting head is constrained to move along a horizontal path, so that the weight of the item does not have a variable effect on the tilting action.

The known arrangement is effective for angles of tilt up to a limit of about 40 degrees. Beyond this angle of tilt the arrangement can become unstable.

It is an object of this invention to provide an improved pantographic control device which remains effective up to much larger angles of tilt for removing a variable weight factor from the tilting action.

SUMMARY OF THE INVENTION

According to the invention, there is provided a control device for a tiltable mounting head, comprising a pantographic-type linkage in which the angular position of a first element relative to a second element is controlled by the meshing of at least two rotational members, such as toothed gears, and means are provided for constraining an intermediate point of the linkage to move along a horizontal path.

In particular, the first element may be a toothed gear, whilst the meshing members may be supported by a central element of the linkage. This central element may embody the point constrained to move in a horizontal path.

The second element may be a rigid arm attached to a gear wheel, which may constitute one of said meshing members. The above-described arrangement effectively provides a pantographic linkage, with unlimited freedom for folding in either sense without risk of instability. If a mounting head is fixedly carried by the second element, its freedom for tilt is substantially unlimited. At the same time, by constraining an intermediate point of the linkage to move in a horizontal path or locus, the centre of gravity of a camera or other item of equipment on the mounting head can be constrained to move, during tilting, in a horizontal path, so that the weight of the item is not a factor which enters into the tilting action. Reference may be made to the above-mentioned patent specification for a fundamental understanding of this action.

BRIEF DESCRIPTION OF THE DRAWINGS

The invention is now exemplified in the following description, making reference to the accompanying drawings, in which.

the single FIGURE shows a pantographic-type linkage in diagrammatic manner.

DESCRIPTION OF THE PREFERRED EMBODIMENT

Figure 1:
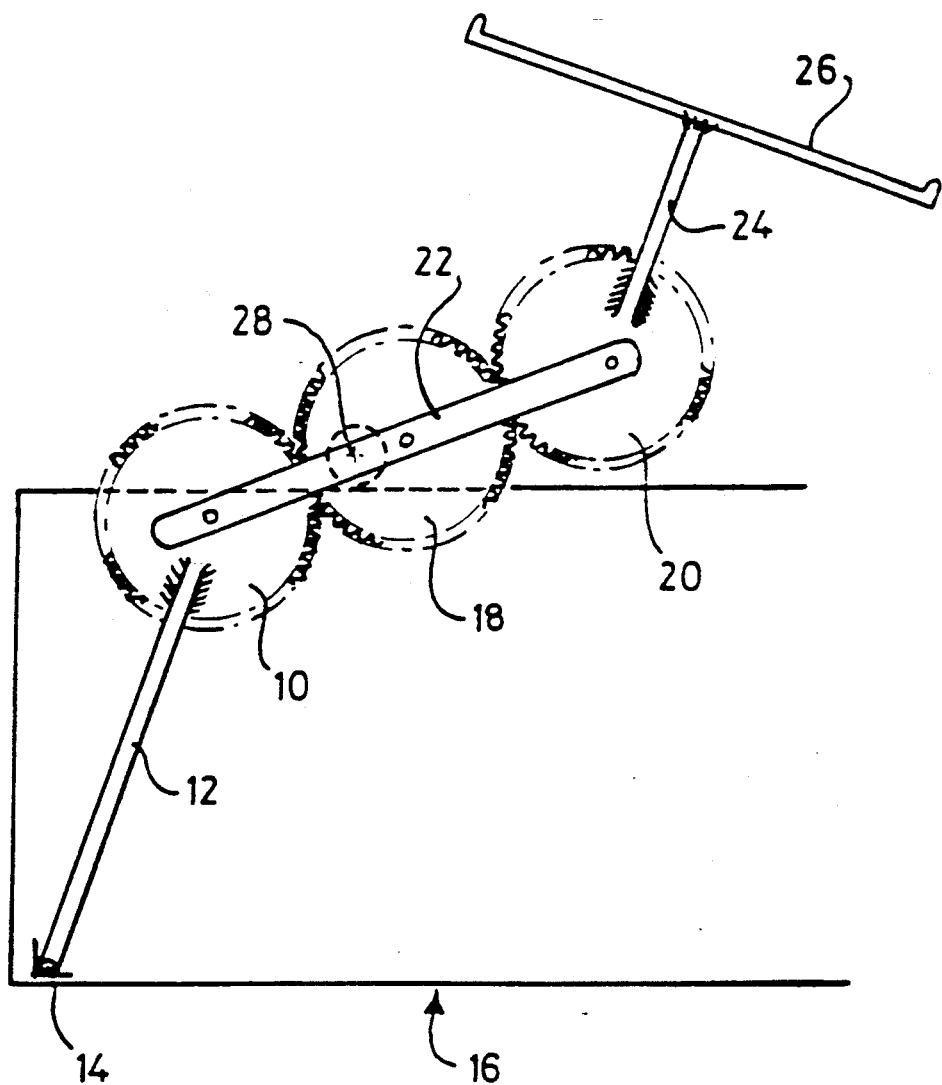
FIG. 1 shows a pantographic-type linkage for use in a control device of a tiltable mounting head in diagrammatic manner in one position of adjustment.

Referring to the drawings, the illustrated pantographic-type linkage comprises a first gear wheel 10 fixedly carrying an arm 12 having its remote end pivotally mounted at 14 to a fixed structure 16.

Gear wheels 18 and 20 form a gear chain with the first gear wheel 10, the axes of all three gears being interconnected on a straight line by a rigid arm 22, which effectively constitutes a central element of the linkage.

Figure 2:
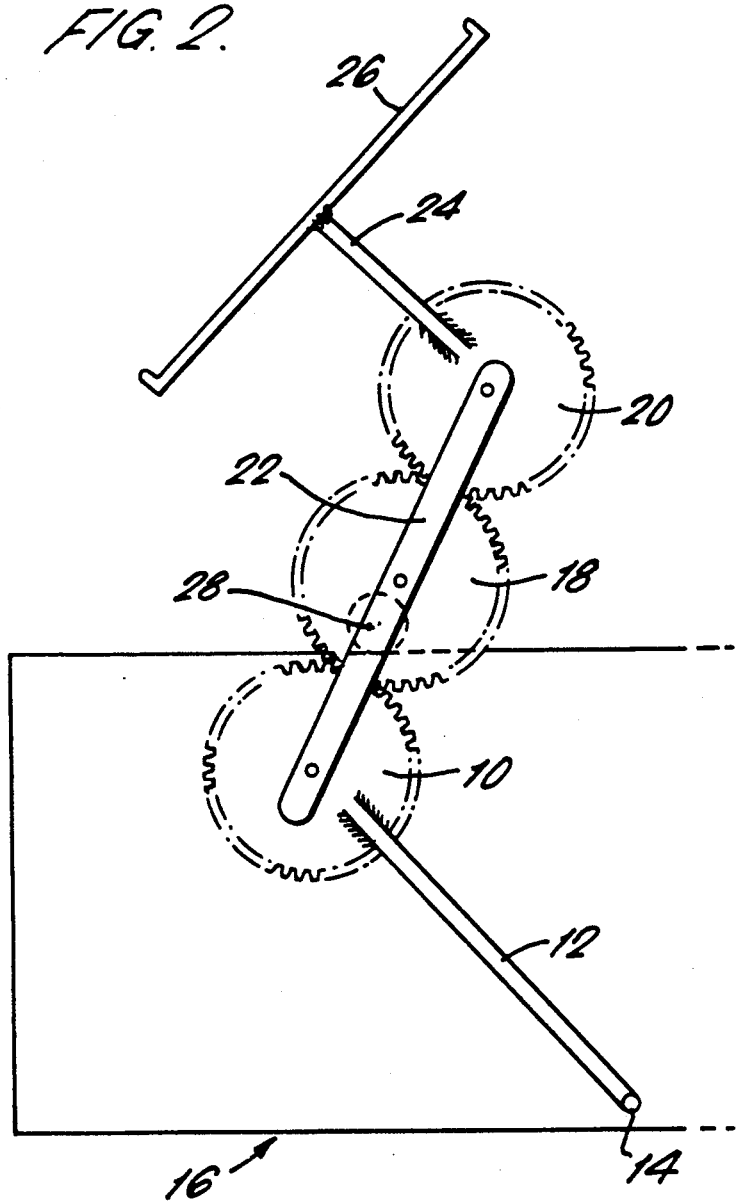
FIG. 2 shows the linkage of FIG. 1 in a further position of adjustment.

The gear wheel 20 fixedly carries an arm 24 supporting a mounting plate 26 for a camera or other item of equipment which is to be controlled in tilt, without influence of its weight on the tilting action. In order to achieve this, a point 28 of the interconnecting arm 22 is constrained to move in a horizontal path or locus defined by the fixed structure 16, as by means of a pin and slot connection. FIGS. 1 and 2 illustrate the linkage in two positions of movement with the mounting plate tilted in one direction from the horizontal and in the opposite direction, respectively.

Considering appropriate radii embodied in the outer gear wheels 10 and 20 of the gear chain, i.e. pairs of parallel radii defined by the direction of the respective arms 12 and 24 fixedly carried by these gear wheels, the above-described linkage can be understood effectively to comprise two pantographs coupled in movement by the central gear wheel 18. Moreover, the additional constraint on the point 28 of the interconnecting arm 22 which supports the gear chain makes it possible to limit movement of the centre of gravity of a camera or the like on the mounting head to a horizontal locus when the camera is tilted by application of manual effort thereto. Thus, the weight of the camera does not affect the tilting action. However, unlike the known arrangement previously referred to, the angle of tilt within which this advantageous effect is achieved is not limited, and a tilting range up to 180 degrees, and theoretically up to 360 degrees, can readily be achieved.

Adjustment to compensate for variation due to differing positions of the centre of gravity of different payloads, is affected by altering the position of the roller 28 along the length of the intermediate strut 22.

I claim:

1. A control device for a tiltable mounting head, comprising a pantographic-type linkage including first and second elements which are movable angularly with respect to one another and means for controlling the relative angular positions of said elements including meshing rotational members to transmit rotation between the first and second elements and means for constraining an intermediate point of the linkage to move along a horizontal path throughout said relative angular movement of the first and second elements of the linkage.

2. A device as claimed in claim 1, wherein the linkage further includes a central element and the meshing rotatable members are mounted for rotation on the central element.

3. A device as claimed in claim 2, wherein three meshing rotatable members are provided, the first and second elements being connected respectively to first and second rotatable members with a third, intermediate rotatable member disposed between the first and second members to transmit rotation therebetween.

4. A control device as claimed in claim 1, wherein the first and second elements comprise rigid arms secured to the rotational members respectively.

5. A control device as claimed in claim 2, wherein the intermediate point is embodied in said central element of the linkage.

6. A device as claimed in claim 1, wherein a mounting head is fixedly carried by said second element and the first element is pivoted to a fixed structure whereby the mounting head can be pivoted through a range of angular movement with respect to the structure.

* * * * *